United States Patent
Iyer et al.

(10) Patent No.: US 9,465,575 B2
(45) Date of Patent: Oct. 11, 2016

(54) FFMA OPERATIONS USING A MULTI-STEP APPROACH TO DATA SHIFTING

(71) Applicant: NVIDIA CORPORATION, Santa Clara, CA (US)

(72) Inventors: Srinivasan Iyer, Austin, TX (US); David Conrad Tannenbaum, Austin, TX (US); Stuart F. Oberman, Sunnyvale, CA (US); Ming (Michael) Y. Siu, Santa Clara, CA (US)

(73) Assignee: NVIDIA Corporation, Santa Clara, CA (US)

( * ) Notice: Subject to any disclaimer, the term of this patent is extended or adjusted under 35 U.S.C. 154(b) by 308 days.

(21) Appl. No.: 13/959,397

(22) Filed: Aug. 5, 2013

(65) Prior Publication Data
US 2015/0039662 A1 Feb. 5, 2015

(51) Int. Cl.
*G06F 7/483* (2006.01)
*G06F 5/01* (2006.01)
*G06F 7/544* (2006.01)

(52) U.S. Cl.
CPC ............. *G06F 5/012* (2013.01); *G06F 7/5443* (2013.01); *G06F 7/483* (2013.01)

(58) Field of Classification Search
None
See application file for complete search history.

(56) References Cited

U.S. PATENT DOCUMENTS

| | | | |
|---|---|---|---|
| 7,716,266 B2 * | 5/2010 | Trong et al. ................... | 708/501 |
| 2006/0173946 A1 * | 8/2006 | Trong et al. ................... | 708/523 |
| 2008/0256161 A1 * | 10/2008 | Quinnell et al. .............. | 708/501 |
| 2011/0040815 A1 * | 2/2011 | Penton et al. ................ | 708/205 |
| 2013/0124592 A1 * | 5/2013 | Manohar et al. ............. | 708/501 |
| 2014/0188966 A1 * | 7/2014 | Galal et al. ................... | 708/501 |
| 2015/0193203 A1 * | 7/2015 | Iyer et al. ..................... | 708/501 |

* cited by examiner

*Primary Examiner* — David H Malzahn
(74) *Attorney, Agent, or Firm* — Artegis Law Group, LLP

(57) ABSTRACT

A fused floating-point multiply-add element includes a multiplier that generates a product, and a shifter that shifts an addend within a narrow range. Interpreting logic analyzes the magnitude of the addend relative to the product and then causes logic arrays to position the shifted addend within the left, center, or right portions of a composite register depending in the magnitude of the addend relative to the product. The interpreting logic also forces other portions of the composite register to zero. When the addend is zero, the interpreting logic forces all portions of the composite register to zero. Final combining logic then adds the contents of the composite register to the product.

22 Claims, 8 Drawing Sheets

FFMA OPERATIONS USING A MULTI-STEP APPROACH TO DATA SHIFTING

BACKGROUND OF THE INVENTION

1. Field of the Invention

Embodiments of the present invention relate generally to graphics processing and, more specifically, to fused floating-point multiply-add operations using a multi-step approach to data shifting.

2. Description of the Related Art

In computer systems, in general, and in graphics processing units (GPUs), in particular, 32-bit floating point arithmetic operations are performed frequently. A floating point number is one in which the decimal point can occur at any location in the string of digits. A fused floating-point multiply-add (FFMA) operation is one that accepts three inputs, A, B, and C, as operands; the A and B operands are multiplied together, and the resulting product is added to the C operand. As the AB multiplication yields a result that is much wider than the original operands, the exponents must be examined and the C operand typically shifted right or left to align the decimal points. The AB product is held static while the C operand is shifted in the appropriate direction to perform the final addition that completes the operation. This shifter must be sized to accommodate the case where the relative exponent values dictate that the C operand be shifted fully to the left of the AB product as well as the case where the relative exponent values dictate that the C operand must be shifted fully to the right. Thus, the resulting shifter must be more than four times the width of the operands.

One drawback to the above approach is that, in the event that the FFMA element is used for a multiply-only operation, the C operand must be set to zero. Setting the C operand to zero necessitates overwriting all of the registers of the previously discussed wide shifter to fully flush out any prior value, entailing the associated power consumption. This drawback is particularly disadvantageous in the event that full FFMA operations alternate with multiply-only operations, as considerable power loss is incurred to simply ensure that a zero is added in the multiply-only mode.

Accordingly, what is needed in the art is a more efficient technique for performing FFMA and multiply-only operations that alternate with one another.

SUMMARY OF THE INVENTION

A computer-implemented method for performing an arithmetic operation, including receiving a mantissa associated with a first operand, shifting the first mantissa to generate a first sequence of bits, storing the first sequence of bits in a first portion of a composite register, storing zeroes in one or more remaining portions of the composite register to generate a composite value, and combining the composite value with the product of a second operand and a third operand to generate a final value.

One advantage of the disclosed approach is that only one narrow shifter is active at any one time to align the additive C operand. In addition, in the event that the FFMA is used in the multiply-only mode, all of the shifter logic may be gated off, thereby effectively creating a zero addend without the need to load the shifter or overwrite any previous value. As the disclosed approach includes an active shifter that is inherently smaller than in prior art and the need to load data in the multiply-only mode is obviated, the disclosed approach provides a more power-efficient approach to FFMA element realization than prior art approaches. The proposed approach also speeds up implementation of FFMA operation or floating point add (FADD) operation. A faster circuit leads to smaller area, which leads to less power consumed overall.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
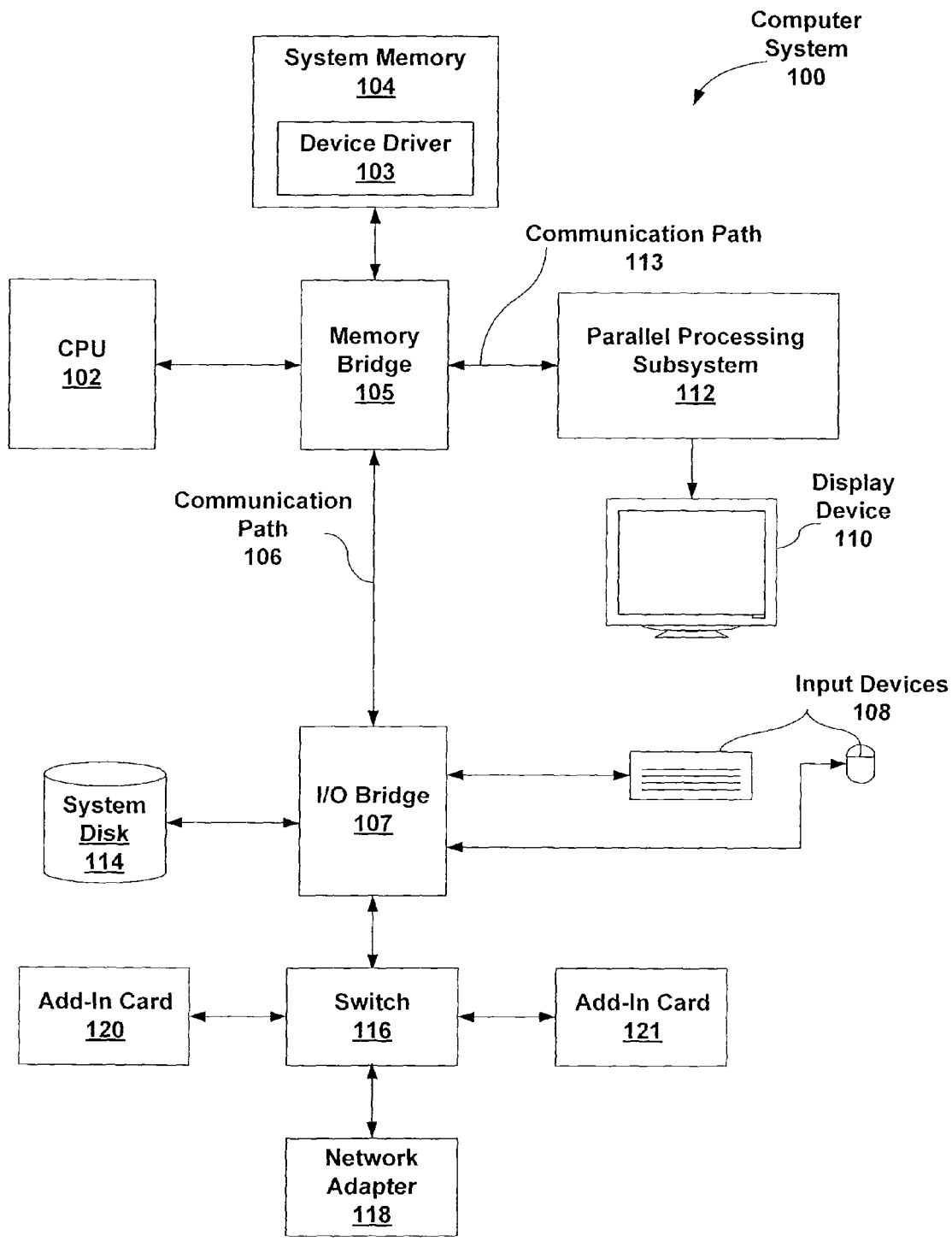
FIG. 1 is a block diagram illustrating a computer system configured to implement one or more aspects of the present invention.

FIG. 1 is a block diagram illustrating a computer system 100 configured to implement one or more aspects of the present invention. As shown, computer system 100 includes, without limitation, a central processing unit (CPU) 102 and a system memory 104 coupled to a parallel processing subsystem 112 via a memory bridge 105 and a communication path 113. Memory bridge 105 is further coupled to an I/O (input/output) bridge 107 via a communication path 106, and I/O bridge 107 is, in turn, coupled to a switch 116.

In operation, I/O bridge 107 is configured to receive user input information from input devices 108, such as a keyboard or a mouse, and forward the input information to CPU 102 for processing via communication path 106 and memory bridge 105. Switch 116 is configured to provide connections between I/O bridge 107 and other components of the computer system 100, such as a network adapter 118 and various add-in cards 120 and 121.

As also shown, I/O bridge 107 is coupled to a system disk 114 that may be configured to store content and applications and data for use by CPU 102 and parallel processing subsystem 112. As a general matter, system disk 114 provides non-volatile storage for applications and data and may include fixed or removable hard disk drives, flash memory devices, and CD-ROM (compact disc read-only-memory), DVD-ROM (digital versatile disc-ROM), Blu-ray, HD-DVD (high definition DVD), or other magnetic, optical, or solid state storage devices. Finally, although not explicitly shown, other components, such as universal serial bus or other port connections, compact disc drives, digital versatile disc drives, film recording devices, and the like, may be connected to I/O bridge 107 as well.

In various embodiments, memory bridge 105 may be a Northbridge chip, and I/O bridge 107 may be a Southbridge chip. In addition, communication paths 106 and 113, as well as other communication paths within computer system 100, may be implemented using any technically suitable protocols, including, without limitation, AGP (Accelerated Graphics Port), HyperTransport, or any other bus or point-to-point communication protocol known in the art.

In some embodiments, parallel processing subsystem 112 comprises a graphics subsystem that delivers pixels to a display device 110 that may be any conventional cathode ray tube, liquid crystal display, light-emitting diode display, or the like. In such embodiments, the parallel processing subsystem 112 incorporates circuitry optimized for graphics and video processing, including, for example, video output circuitry. As described in greater detail below in FIG. 2, such circuitry may be incorporated across one or more parallel processing units (PPUs) included within parallel processing subsystem 112. In other embodiments, the parallel processing subsystem 112 incorporates circuitry optimized for general purpose and/or compute processing. Again, such circuitry may be incorporated across one or more PPUs included within parallel processing subsystem 112 that are configured to perform such general purpose and/or compute operations. In yet other embodiments, the one or more PPUs included within parallel processing subsystem 112 may be configured to perform graphics processing, general purpose processing, and compute processing operations. System memory 104 includes at least one device driver 103 configured to manage the processing operations of the one or more PPUs within parallel processing subsystem 112.

In various embodiments, parallel processing subsystem 112 may be integrated with one or more of the other elements of FIG. 1 to form a single system. For example, parallel processing subsystem 112 may be integrated with CPU 102 and other connection circuitry on a single chip to form a system on chip (SoC).

It will be appreciated that the system shown herein is illustrative and that variations and modifications are possible. The connection topology, including the number and arrangement of bridges, the number of CPUs 102, and the number of parallel processing subsystems 112, may be modified as desired. For example, in some embodiments, system memory 104 could be connected to CPU 102 directly rather than through memory bridge 105, and other devices would communicate with system memory 104 via memory bridge 105 and CPU 102. In other alternative topologies, parallel processing subsystem 112 may be connected to I/O bridge 107 or directly to CPU 102, rather than to memory bridge 105. In still other embodiments, I/O bridge 107 and memory bridge 105 may be integrated into a single chip instead of existing as one or more discrete devices. Lastly, in certain embodiments, one or more components shown in FIG. 1 may not be present. For example, switch 116 could be eliminated, and network adapter 118 and add-in cards 120, 121 would connect directly to I/O bridge 107.

Figure 2:
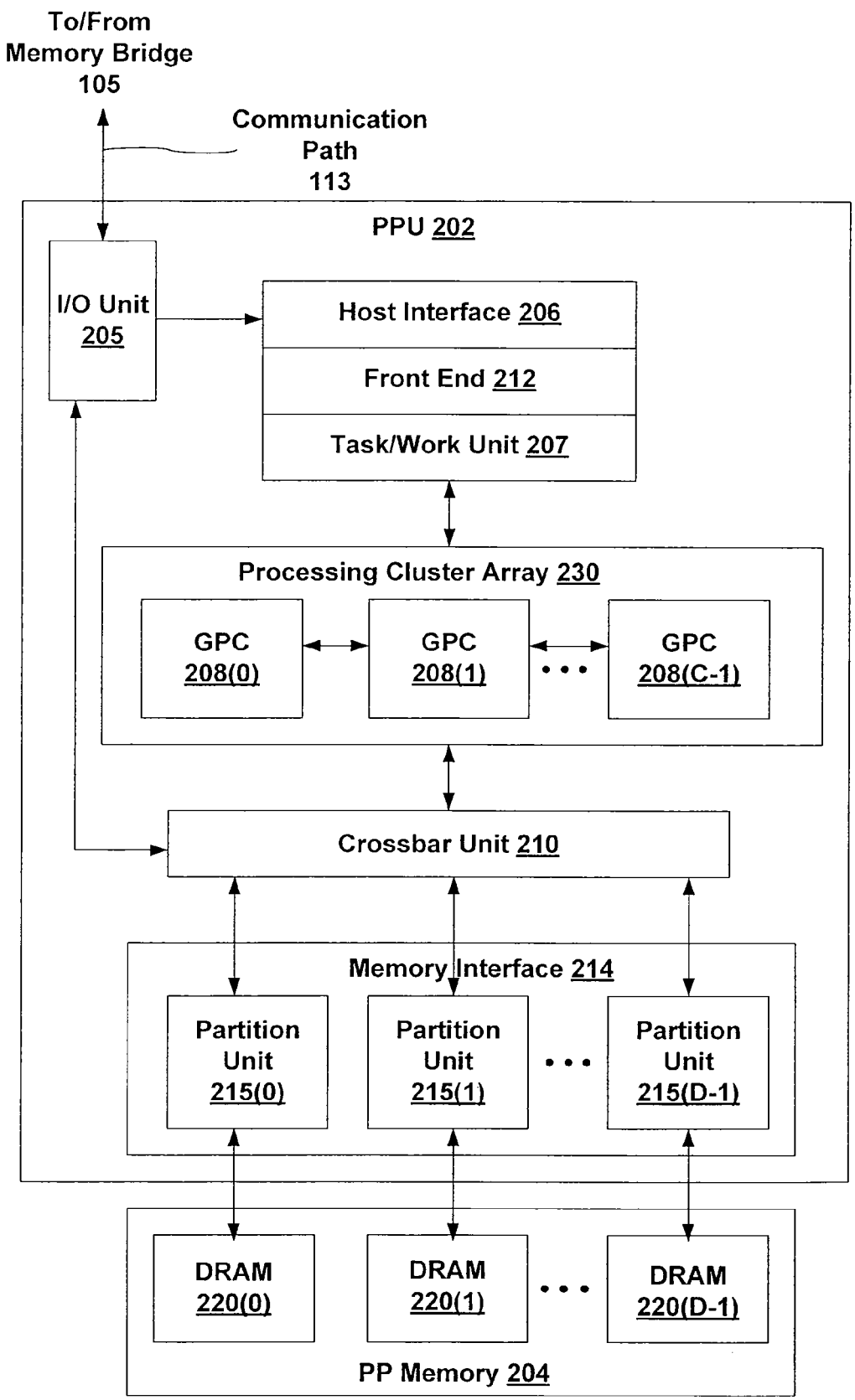
FIG. 2 is a block diagram of a parallel processing unit included in the parallel processing subsystem of FIG. 1, according to one embodiment of the present invention.

FIG. 2 is a block diagram of a parallel processing unit (PPU) 202 included in the parallel processing subsystem 112 of FIG. 1, according to one embodiment of the present invention. Although FIG. 2 depicts one PPU 202, as indicated above, parallel processing subsystem 112 may include any number of PPUs 202. As shown, PPU 202 is coupled to a local parallel processing (PP) memory 204. PPU 202 and PP memory 204 may be implemented using one or more integrated circuit devices, such as programmable processors, application specific integrated circuits (ASICs), or memory devices, or in any other technically feasible fashion.

In some embodiments, PPU 202 comprises a graphics processing unit (GPU) that may be configured to implement a graphics rendering pipeline to perform various operations related to generating pixel data based on graphics data supplied by CPU 102 and/or system memory 104. When processing graphics data, PP memory 204 can be used as graphics memory that stores one or more conventional frame buffers and, if needed, one or more other render targets as well. Among other things, PP memory 204 may be used to store and update pixel data and deliver final pixel data or display frames to display device 110 for display. In some embodiments, PPU 202 also may be configured for general-purpose processing and compute operations.

In operation, CPU 102 is the master processor of computer system 100, controlling and coordinating operations of other system components. In particular, CPU 102 issues commands that control the operation of PPU 202. In some embodiments, CPU 102 writes a stream of commands for PPU 202 to a data structure (not explicitly shown in either FIG. 1 or FIG. 2) that may be located in system memory 104, PP memory 204, or another storage location accessible to both CPU 102 and PPU 202. A pointer to the data structure is written to a pushbuffer to initiate processing of the stream of commands in the data structure. The PPU 202 reads command streams from the pushbuffer and then executes commands asynchronously relative to the operation of CPU 102. In embodiments where multiple pushbuffers are generated, execution priorities may be specified for each pushbuffer by an application program via device driver 103 to control scheduling of the different pushbuffers.

As also shown, PPU 202 includes an I/O (input/output) unit 205 that communicates with the rest of computer system 100 via the communication path 113 and memory bridge 105. I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to PP memory 204) may be directed to a crossbar unit 210. Host interface 206 reads each pushbuffer and transmits the command stream stored in the pushbuffer to a front end 212.

As mentioned above in conjunction with FIG. 1, the connection of PPU 202 to the rest of computer system 100 may be varied. In some embodiments, parallel processing subsystem 112, which includes at least one PPU 202, is implemented as an add-in card that can be inserted into an expansion slot of computer system 100. In other embodiments, PPU 202 can be integrated on a single chip with a bus bridge, such as memory bridge 105 or I/O bridge 107. Again, in still other embodiments, some or all of the elements of PPU 202 may be included along with CPU 102 in a single integrated circuit or system on chip (SoC).

In operation, front end 212 transmits processing tasks received from host interface 206 to a work distribution unit (not shown) within task/work unit 207. The work distribution unit receives pointers to processing tasks that are encoded as task metadata (TMD) and stored in memory. The pointers to TMDs are included in a command stream that is stored as a pushbuffer and received by the front end unit 212 from the host interface 206. Processing tasks that may be encoded as TMDs include indices associated with the data to be processed as well as state parameters and commands that define how the data is to be processed. For example, the state parameters and commands could define the program to be executed on the data. The task/work unit 207 receives tasks from the front end 212 and ensures that GPCs 208 are configured to a valid state before the processing task specified by each one of the TMDs is initiated. A priority may be specified for each TMD that is used to schedule the execution of the processing task. Processing tasks also may be received from the processing cluster array 230. Optionally, the TMD may include a parameter that controls whether the TMD is added to the head or the tail of a list of processing tasks (or to a list of pointers to the processing tasks), thereby providing another level of control over execution priority.

PPU 202 advantageously implements a highly parallel processing architecture based on a processing cluster array 230 that includes a set of C general processing clusters (GPCs) 208, where C≥1. Each GPC 208 is capable of executing a large number (e.g., hundreds or thousands) of threads concurrently, where each thread is an instance of a program. In various applications, different GPCs 208 may be allocated for processing different types of programs or for performing different types of computations. The allocation of GPCs 208 may vary depending on the workload arising for each type of program or computation.

Memory interface 214 includes a set of D of partition units 215, where D≥1. Each partition unit 215 is coupled to one or more dynamic random access memories (DRAMs) 220 residing within PPM memory 204. In one embodiment, the number of partition units 215 equals the number of DRAMs 220, and each partition unit 215 is coupled to a different DRAM 220. In other embodiments, the number of partition units 215 may be different than the number of DRAMs 220. Persons of ordinary skill in the art will appreciate that a DRAM 220 may be replaced with any other technically suitable storage device. In operation, various render targets, such as texture maps and frame buffers, may be stored across DRAMs 220, allowing partition units 215 to write portions of each render target in parallel to efficiently use the available bandwidth of PP memory 204.

A given GPC 208 may process data to be written to any of the DRAMs 220 within PP memory 204. Crossbar unit 210 is configured to route the output of each GPC 208 to the input of any partition unit 215 or to any other GPC 208 for further processing. GPCs 208 communicate with memory interface 214 via crossbar unit 210 to read from or write to various DRAMs 220. In one embodiment, crossbar unit 210 has a connection to I/O unit 205, in addition to a connection to PP memory 204 via memory interface 214, thereby enabling the processing cores within the different GPCs 208 to communicate with system memory 104 or other memory not local to PPU 202. In the embodiment of FIG. 2, crossbar unit 210 is directly connected with I/O unit 205. In various embodiments, crossbar unit 210 may use virtual channels to separate traffic streams between the GPCs 208 and partition units 215.

Again, GPCs 208 can be programmed to execute processing tasks relating to a wide variety of applications, including, without limitation, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel/fragment shader programs), general compute operations, etc. In operation, PPU 202 is configured to transfer data from system memory 104 and/or PP memory 204 to one or more on-chip memory units, process the data, and write result data back to system memory 104 and/or PP memory 204. The result data may then be accessed by other system components, including CPU 102, another PPU 202 within parallel processing subsystem 112, or another parallel processing subsystem 112 within computer system 100.

As noted above, any number of PPUs 202 may be included in a parallel processing subsystem 112. For example, multiple PPUs 202 may be provided on a single add-in card, or multiple add-in cards may be connected to communication path 113, or one or more of PPUs 202 may be integrated into a bridge chip. PPUs 202 in a multi-PPU system may be identical to or different from one another. For example, different PPUs 202 might have different numbers of processing cores and/or different amounts of PP memory 204. In implementations where multiple PPUs 202 are present, those PPUs may be operated in parallel to process data at a higher throughput than is possible with a single PPU 202. Systems incorporating one or more PPUs 202 may be implemented in a variety of configurations and form factors, including, without limitation, desktops, laptops, handheld personal computers or other handheld devices, servers, workstations, game consoles, embedded systems, and the like.

FFMA Operations Using a Multi-Step Approach to Data Shifting

Figure 3:
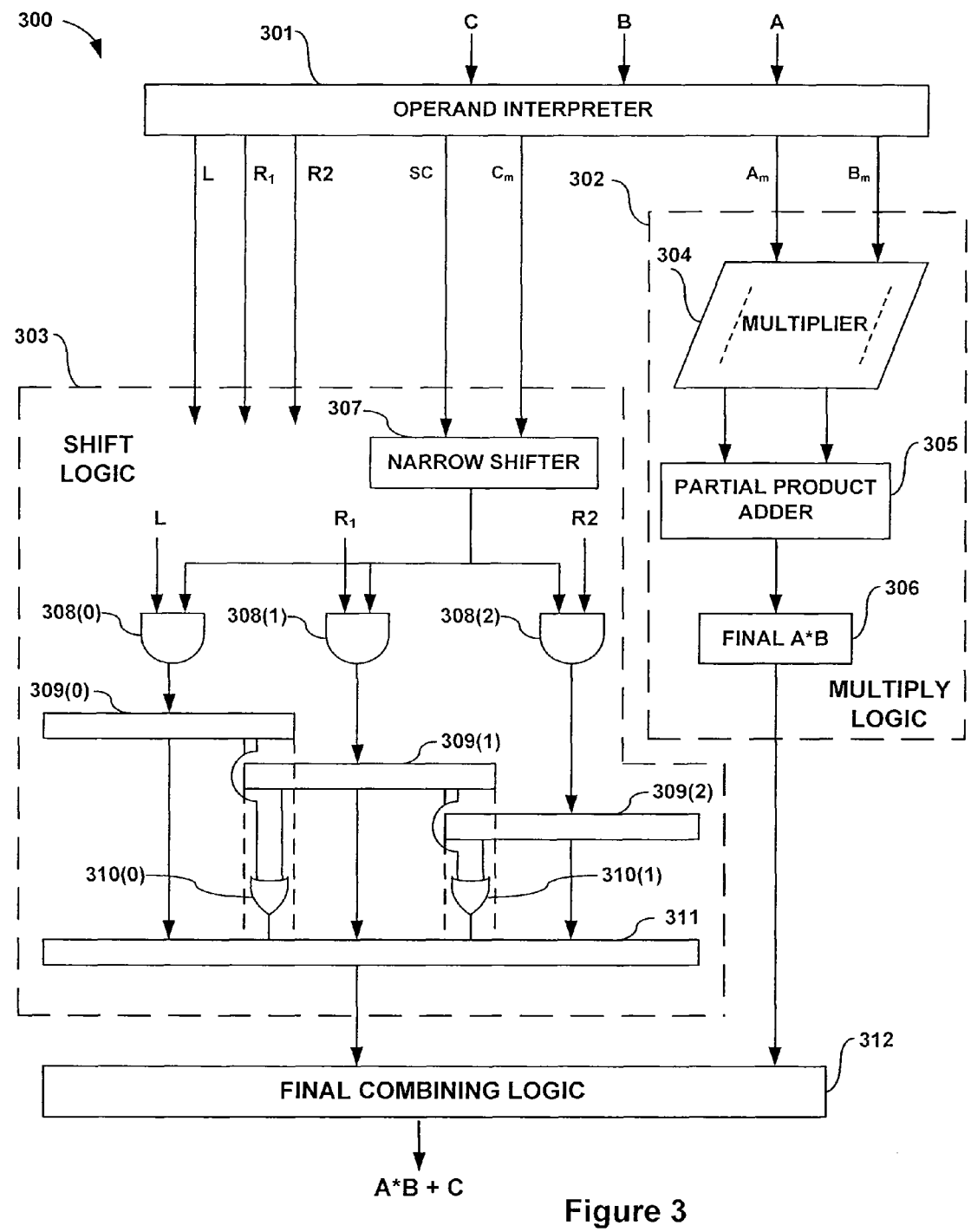
FIG. 3 is a conceptual diagram of an FFMA element, according to one embodiment of the present invention.

FIG. 3 is a conceptual diagram of an FFMA element 300, according to one embodiment of the present invention. FFMA element 300 may be included within any portion of computer system 100 of FIG. 1 that is configured to perform floating point operations. For example, CPU 102 of FIG. 1 or PPU 202 of FIG. 2 may include one or more instances of FFMA element 300. As a general matter, FFMA element 300 may be incorporated into any type of computer device, including server machines, desktop machines, laptop computers, mobile devices, handheld devices, and so forth.

As shown, FFMA element 300 includes an operand interpreter 301 that is coupled to multiply logic 302 and shift logic 303. Multiply logic 302 and shift logic 303 are coupled to final combining logic 312. Multiply logic 302 includes a multiplier element 304, partial product adder 305, and final A·B 306. Shift logic 303 includes narrow shifter 307, AND-gate arrays 308 that generate shifted data segments 309, and OR-gate arrays 310 coupled to composite register 311.

Operand interpreter 301 receives operands A, B, and C and extracts mantissas and exponents. Operand interpreter 301 applies mantissas $A_m$ and $B_m$ to multiplier 304 which produces input to partial product adder 305. Partial product adder 305 generates final A·B 306 as input to final combining logic 312.

Operand interpreter 301 examines the relative positions of the exponents of operands A, B, and C, and generates controls L, R1, and R2 for shift logic block 303. Operand interpreter 301 applies mantissa $C_m$ and a shift control signal (shown as SC) to narrow shifter 307. Narrow shifter 307 shifts mantissa data $C_m$ within the narrow shift range as directed by shift control SC. Narrow shifter 307 applies common shifted mantissa data to AND-gate arrays 308(0), 308(1), and 308(2).

AND-gate array 308(0), shown conceptually as a single AND gate, consists of a multiplicity of gates equal in number to the number of bits in the narrow shifter 307 output, with common input, L, controlling each gate element. AND-gate arrays 308(1) and 308(2) are identical to AND-gate array 308(0) with R1 and R2 as control inputs, respectively. Operand interpreter 301 provides controls L, R1, and R2 to the respective AND-gate arrays.

Figure 4:
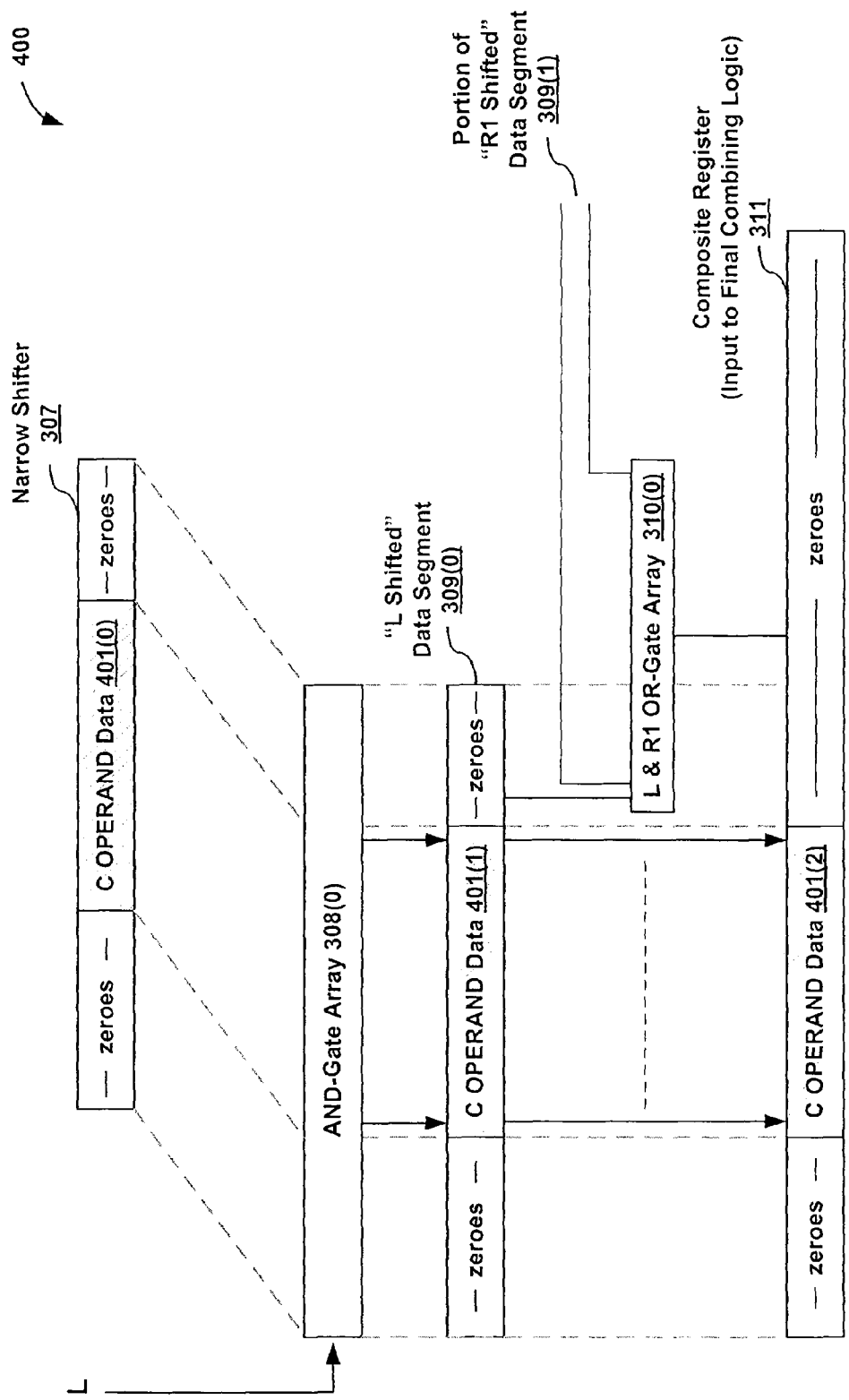
FIG. 4 is a conceptual diagram of data that is shifted to the left by the FFMA element of FIG. 3.

When mantissa $C_m$ is much greater than final A·B 306, e.g. when the decimal point associated with $C_m$ resides greater than a threshold number of bits to the right of the decimal point associated with final A·B 306, C mantissa data should be shifted to the left relative to final A·B 306. In this case, Operand interpreter 301 sets control signal L true, which gates the output of narrow shifter 307 to data segment 309(0). Operand interpreter 301 then sets control signals R1 and R2 to false, which forces data segments 309(1) and 309(2) to all zeroes. FIG. 4 provides an example of C mantissa data that is shifted to the left.

Figure 6:
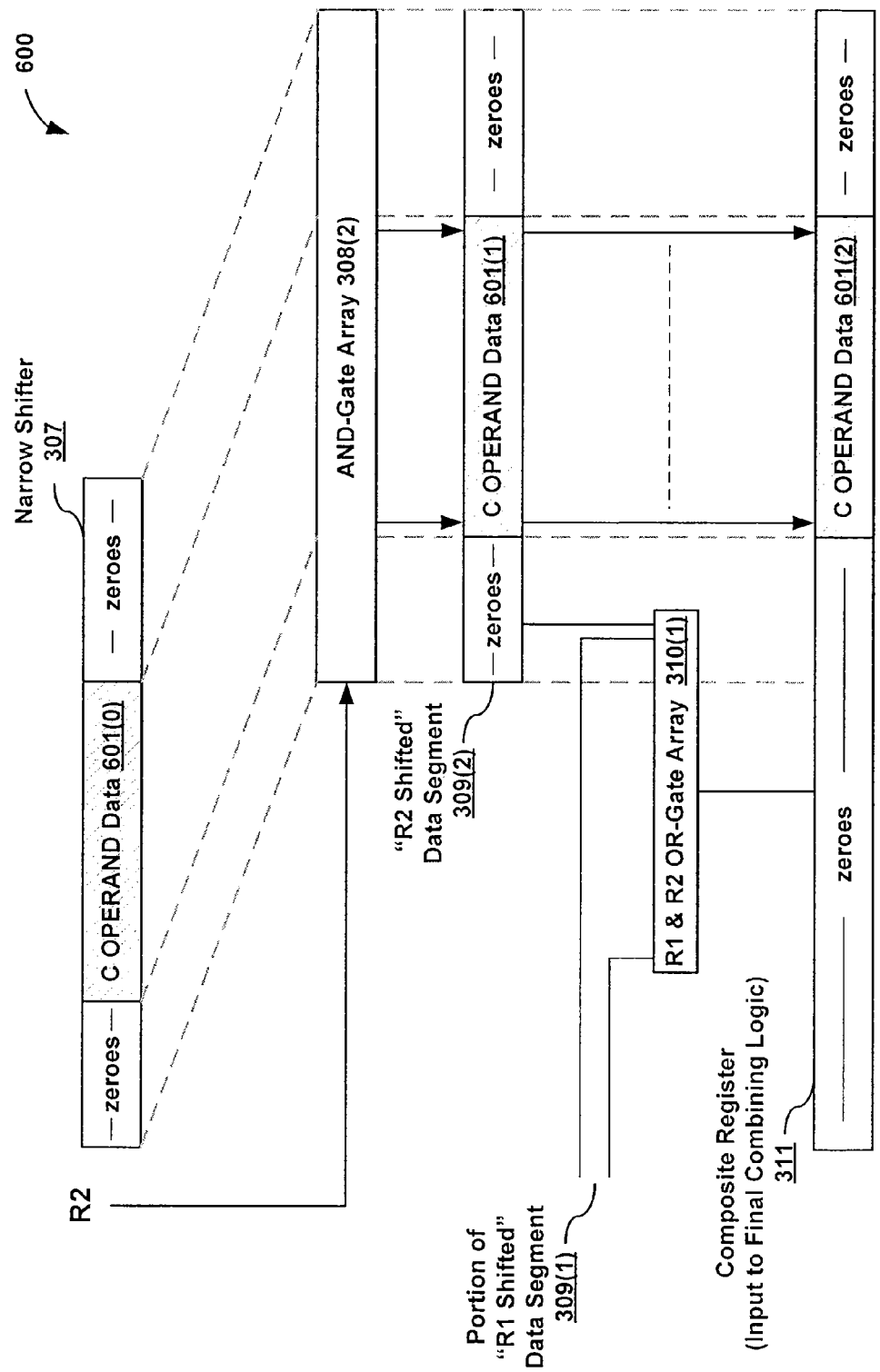
FIG. 6 is a conceptual diagram of data that is shifted to the right by the FFMA element of FIG. 3.

When mantissa $C_m$ is much less than final A·B 306, e.g. when the decimal point associated with $C_m$ resides greater than a threshold number of bits to the left of the decimal point associated with final A·B 306, C mantissa data should be shifted further to the right of final A·B 306. In this case, Operand interpreter 301 sets control signal R2 true, which gates the output of narrow shifter 307 to data segment 309(2). Operand interpreter 301 then sets control signals L and R1 to false, which forces data segments 309(0) and 309(1) to all zeroes. FIG. 6 provides an example of C mantissa data that is shifted to the right.

Figure 5:
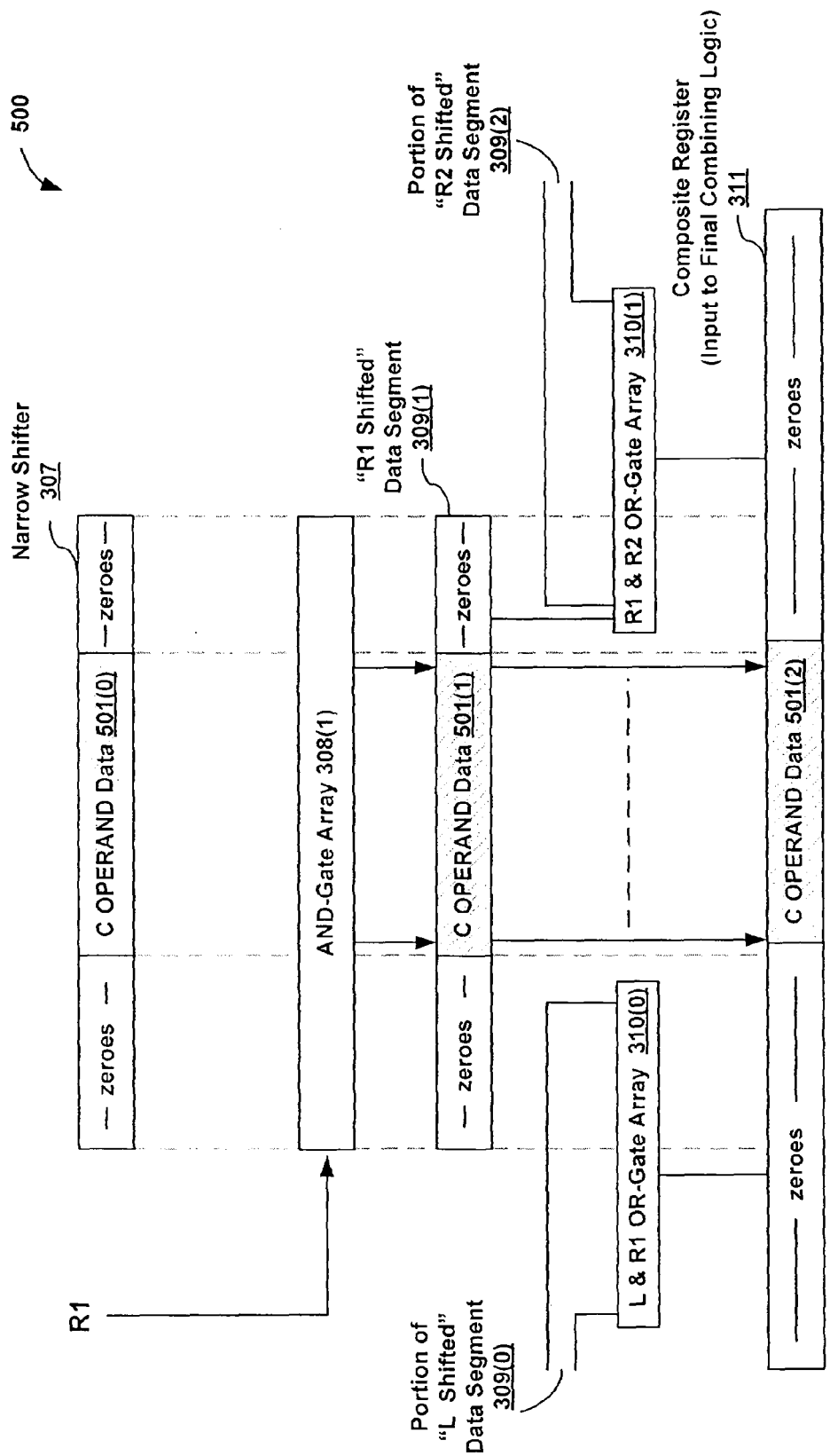
FIG. 5 is a conceptual diagram of data that is centrally shifted by the FFMA element of FIG. 3.

When mantissa $C_m$ is comparable in value to final A·B 306, e.g. when the decimal point associated with $C_m$ resides less than a threshold number of bits from the decimal point associated with final A·B 306, C mantissa data should be shifted generally in the center region of final A·B 306. In this case, operand interpreter 301 sets control signal R1 true, which gates the output of narrow shifter 307 to data segment 309(1). Operand interpreter 301 then sets control signals L and R2 to false, which forces data segments 309(0) and 309(2) to all zeroes. FIG. 5 provides an example of C mantissa data that is centrally shifted.

Composite register 311 combines the content of data segments 309(0), 309(1), and 309(2). OR-gate arrays 310(0) and 310(1) contribute to this combination where overlap of the data segments 309 occurs. Only one data segment 309 may include non-zero data at any instance.

Final combining logic 312 performs the addition of the content of composite register 311 and final A·B 306 product to produce FFMA resultant A·B+C.

In the event that the arithmetic element is to perform a multiply-only operation, mantissa $C_m$ should be set to all zeroes. In this case, operand interpreter 301 sets the three control signals L, R1, and R2 to false, forcing all data segments 309 to contain all zeroes and, consequently, forcing the content of composite register 311 to all zeroes. It is, then, unnecessary to shift out any prior data content of narrow shifter 307, and narrow shifter 307 is forced to an idle state.

FIG. 4 is a conceptual diagram of data 401(1) that is shifted to the left by the FFMA element 300 of FIG. 3. C operand data 401(0) is shown generally in the center of the shifter range, but depending on the relative exponents of AB and C, C operand data 401(0) may move further right or left. When control signal L is true, AND-gate array 308(0) outputs C operand data 401(1) within "L Shifted" data segment 309(0), as shown, and loads C operand data 401(2) into composite register 311. The portion of "L Shifted" data segment 309(0) that overlaps with a portion of "R1 Shifted" data segment 309(1) is loaded into composite register 311 through L & R1 OR-gate array 310(0). As valid data appears in only one data segment 309 at any instant, L & R1 OR-gate array 310(0) will load either valid data or all zeroes into composite register 311. When control signal L is false, AND-gate array 308(0) outputs all zeroes, and loads the left portion of composite register 311 with all zeroes. In one embodiment, a range of exponents between $(A_e+B_e)-C_e$ determines whether to enable L, R1, or R2.

FIG. 5 is a conceptual diagram of data 501(1) that is centrally shifted by the FFMA element 300 of FIG. 3. C operand data 501(0) is again shown generally in the center of the shifter range, but may move further right or left. When control signal R1 is true, AND-gate array 308(1) outputs C operand data 501(1) within "R1 Shifted" data segment 309(1) as shown, and loads C operand data 501(2) into composite register 311. The portion of "R1 Shifted" data segment 309(1) that overlaps with a portion of "L Shifted" data segment 309(0) is loaded into composite register 311 through L & R1 OR-gate array 310(0). The portion of "R1 Shifted" data segment 309(1) that overlaps with a portion of "R2 Shifted" data segment 309(2) is loaded into composite register 311 through R1 & R2 OR-gate array 310(1). As valid data appears in only one data segment 309 at any instant, OR-gate arrays 310 will load either valid data or all zeroes into composite register 311. When control signal R1 is false, AND-gate array 308(1) outputs all zeroes, and loads the center portion of composite register 311 with all zeroes.

FIG. 6 is a conceptual diagram of data 601(1) that is shifted to the right by the FFMA element 300 of FIG. 3. C operand data 601(0) is again shown generally in the center of the shifter range, but may move further right or left. When control signal R2 is true, AND-gate array 308(2) outputs C operand data 601(1) within "L Shifted" data segment 309(2) as shown, and loads C operand data 601(2) into composite register 311. The portion of "R2 Shifted" data segment 309(2) that overlaps with a portion of "R1 Shifted" data segment 309(1) is loaded into composite register 311 through R1 & R2 OR-gate array 310(1). As valid data appears in only one data segment 309 at any instant, R1 & R2 OR-gate array 310(1) will load either valid data or all zeroes into composite register 311. When control signal R2 is false, AND-gate array 308(2) outputs all zeroes, and loads the right portion of composite register 311 with all zeroes. Again, the range of (A+B–C), where A, B, and C are exponents, may determine whether shifting is to L, R1, or R2 boundaries, according to one embodiment of the invention.

Figure 7:
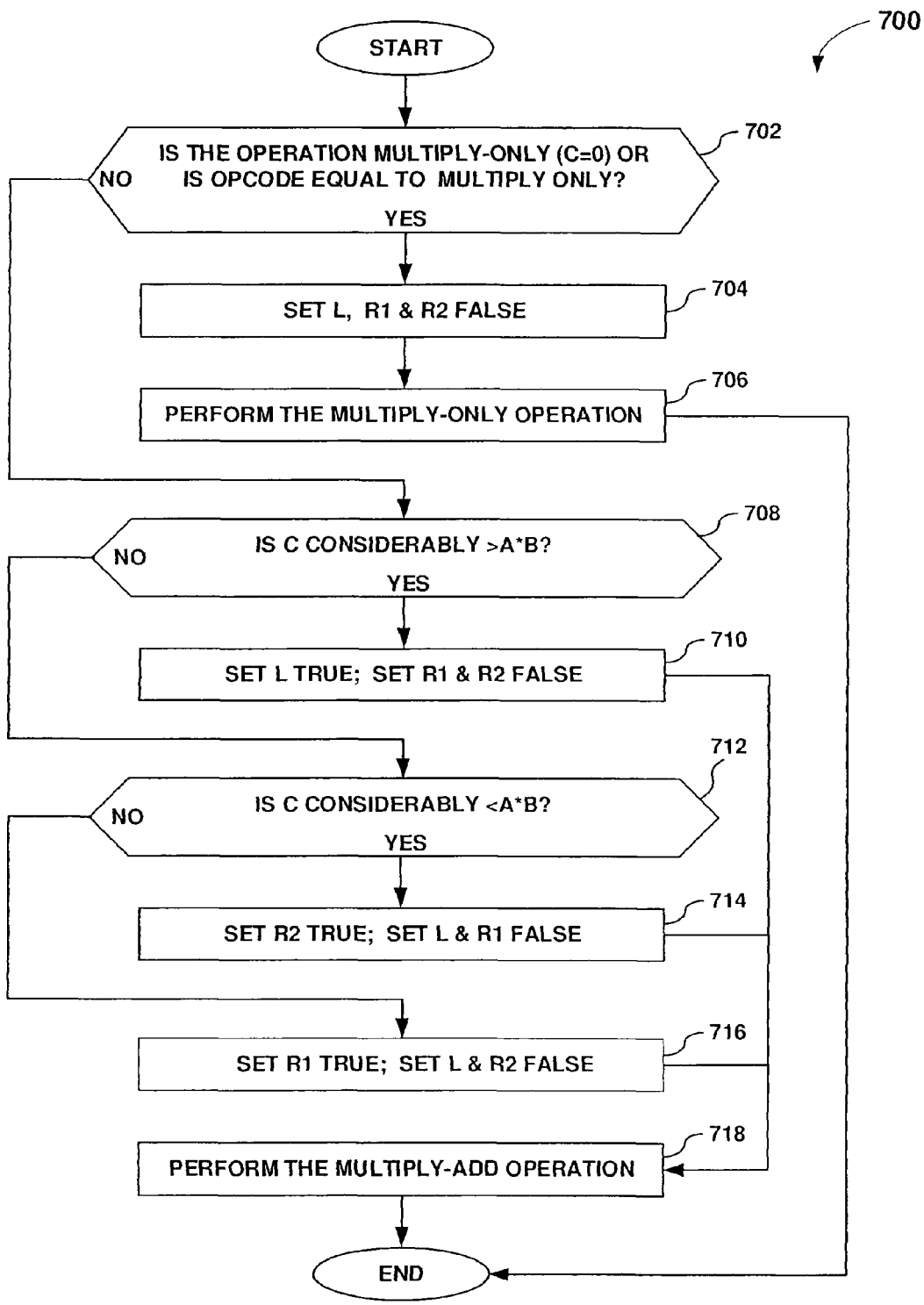
FIG. 7 is a flow diagram of method steps for determining a direction to shift an operand when performing a multiply-only or multiply-add operation, according to one embodiment of the present invention.

FIG. 7 is a flow diagram of method steps for determining a direction to shift an operand when performing a multiply-only or multiply-add operation, according to one embodiment of the present invention. Although the method steps are described in conjunction with the systems of FIGS. 1-6, persons skilled in the art will understand that any system configured to perform the method steps, in any order, is within the scope of the present invention.

As shown, a method 700 begins at step 702, where operand interpreter 301 examines the C operand to determine if the operation that should be performed is multiply-only or multiply-add. The same determination can also be performed based on an incoming opcode. A zero value of C operand implies multiply-only. If the operand interpreter 301 determines that the operation is multiply-only, then operand interpreter 301 proceeds to step 704. At step 704, operand interpreter 301 sets the three control signals, L, R1, and R2 to false and places narrow shifter 307 in an idle condition. Composite register 311 then contains all zeroes without the need to flush out any prior value from narrow shifter 307, thus reducing the dynamic power needed to perform the operation. In step 706, final combining logic 312 adds the A·B product to the all zero content of composite register 311 to complete the multiply-only operation.

A non-zero value of the C operand in step 702 indicates that a multiply-add operation should occur. At step 708, if operand interpreter 301 determines that the C operand is considerably greater than the product A·B, then the method 700 proceeds to step 710. At step 710, operand interpreter 301 sets control signal L to true and sets control signals R1 and R2 to false. Then the method proceeds to step 718, where the multiply-add operation is performed with L set to true and R1 & R2 set to false.

At step 708, if operand interpreter 301 determines that the C operand is not considerably greater than the product A·B, then the method proceeds to step 712. At step 712, if operand interpreter 301 determines that the C operand is considerably less than the product A·B, then the method 700 proceeds to step 714. At step 714, operand interpreter 301 sets control signal R2 to true and sets control signals L and R1 to false. Then the method proceeds to step 718, where the multiply add operation is performed with R2 set to true and L & R1 set to false.

At step 712, if operand interpreter 301 determines that the C operand is not considerably less than the product A·B, then, C operand being neither considerably greater nor considerably less than product A·B, operand interpreter 301 determines that the C operand is comparable to product AB. The method 700 then proceeds to step 716. At step 716, operand interpreter 301 sets control signal R1 to true and sets control signals L and R2 to false. Then the method proceeds to step 718, where the multiply add operation is performed with R1 set to true and L & R2 set to false.

Once the control signal decision is made in step 710, step 714 or step 716, final combining logic 312 adds the appropriately positioned contents of composite register 311 with product A·B, in step 718, to complete the FFMA operation.

Figure 8:
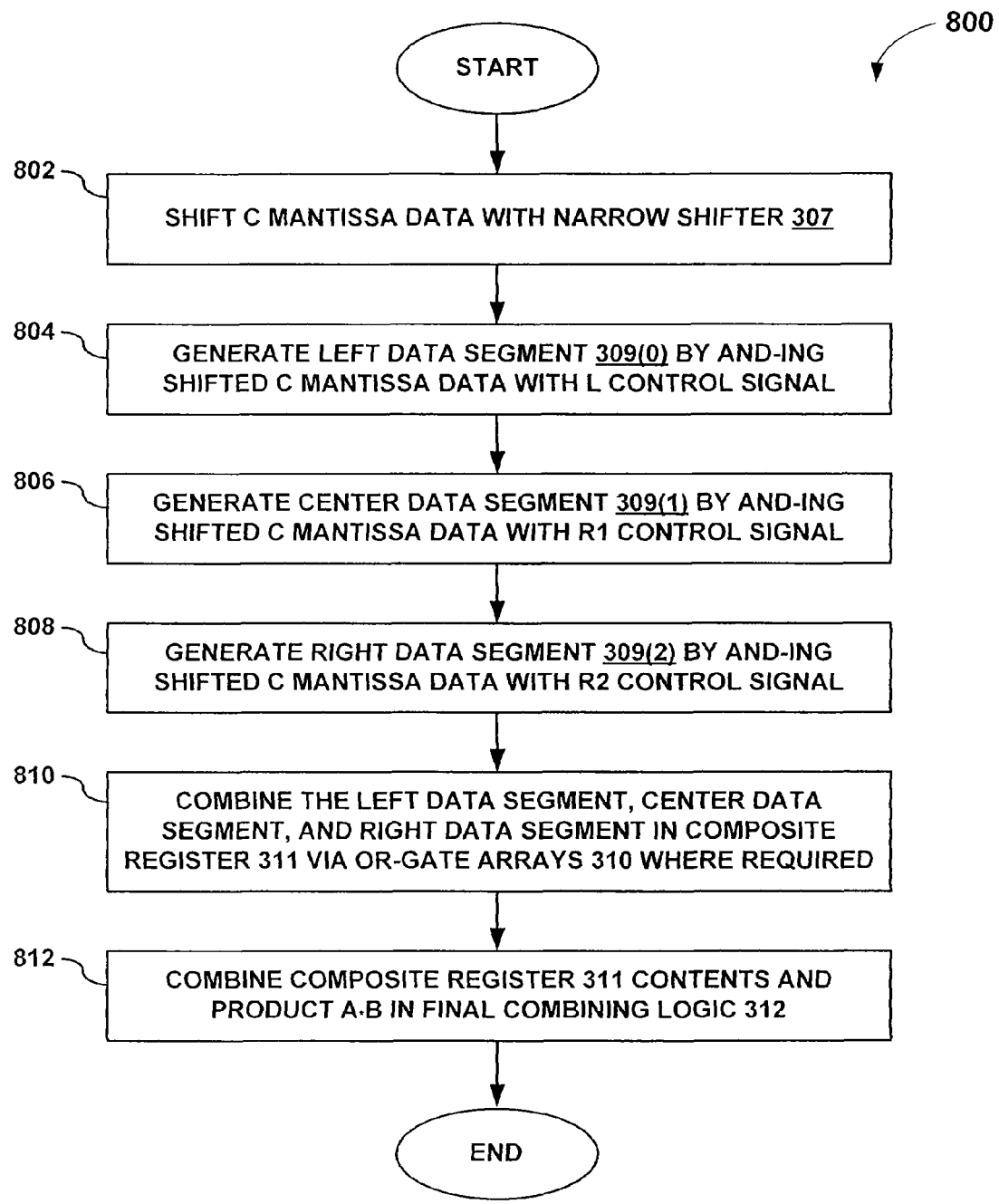
FIG. 8 is a flow diagram of method steps for shifting an operand to perform a multiply-only or multiply-add operation, according to one embodiment of the present invention.

FIG. 8 is a flowchart of method steps for shifting an operand to perform a multiply-only or multiply-add operation, according to one embodiment of the present invention. Although the method steps are described in conjunction with the systems of FIGS. 1-6, persons skilled in the art will understand that any system configured to perform the method steps, in any order, is within the scope of the present invention.

As shown, a method 800 starts at step 802, where narrow shifter 307 positions C mantissa data within the shifter range.

At step 804, AND-gate array 308(0) generates the left data segment by AND-ing the shifted C mantissa data with the L control signal. When L is set to true, the left data segment includes shifted C operand data; otherwise, the left data segment includes zeroes. At step 806, AND-gate array 308(1) generates the center data segment by AND-ing the shifted C mantissa data with the R1 control signal. When R1 is set to true, the center data segment includes shifted C operand data; otherwise, the center data segment includes zeroes. At step 808, AND-gate array 308(2) generates the right data segment by AND-ing the shifted C mantissa data with the R2 control signal. When R2 is set to true, the right data segment includes shifted C operand data; otherwise, the right data segment includes zeroes. Persons skilled in the art will recognize that steps 804, 806, and 808 may be performed in parallel with one another.

In step 810, AND-gate arrays 308 combine left data segment, center data segment, and right data segment in composite register 311. Where overlap of the segments occurs, OR-gate arrays 310 combine the overlapping contents. At step 812, final combining logic 312 adds the contents of composite register 311 to the product final A·B 306 to complete the multiply-only operation.

In sum, an FFMA element includes a multiplier that generates a product, and a shifter that shifts an addend within a narrow range. Interpreting logic analyzes the magnitude of the addend relative to the product and then causes logic arrays to position the shifted addend within the left, center, or right segments of a composite register. When the addend is much greater than the product, the interpreting logic positions the shifted addend in the left segment of the composite register and forces the center and right segments to zero. When the addend is much less than the product, the interpreting logic positions the shifted addend in the right segment of the composite register and forces the center and left segments to zero. When the addend is comparable in magnitude to the product, the interpreting logic positions the shifted addend in the center segment of the composite register and forces the left and right segments to zero. When the addend is zero, the interpreting logic forces all segments of the composite register to zero. Final combining logic then adds the contents of the composite register to the product to complete an FFMA operation.

One advantage of the systems disclosed herein is that a substantial reduction in dynamic power is realized due to the limited width of the narrow shifter compared to prior art. In addition, chip real estate usage and power overhead due to leakage are both reduced as the gate arrays are smaller and simpler than the flip-flop arrays that they replace in conventional designs. Finally, significant power reduction may be realized in the event of multiply-only operations alternating, or frequently interspersed, with multiply-add operations, due to avoidance of the need to flush the shifter of prior values with each multiply-only operation.

The invention has been described above with reference to specific embodiments. Persons of ordinary skill in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

Therefore, the scope of embodiments of the present invention is set forth in the claims that follow.

The invention claimed is:

1. A computer-implemented method for performing an arithmetic operation, the method comprising:
   receiving a first mantissa associated with a first operand;
   shifting the first mantissa based on a difference between the first mantissa and a first product of a second operand and a third operand to generate a first sequence of bits;
   storing the first sequence of bits in a first portion of a composite register;
   storing zeroes in one or more remaining portions of the composite register to generate a composite value;
   combining the composite value with the first product to generate a final value.

2. The computer-implemented method of claim 1, further comprising generating the composite value to align the first mantissa with the product of the second operand and the third operand.

3. The computer-implemented method of claim 1, further comprising selecting the first portion of the composite register by:
   determining that the first operand exceeds the product of the second operand and the third operand by a threshold value; and
   identifying a set of least significant bits in the composite register.

4. The computer-implemented method of claim 1, further comprising selecting the first portion of the composite register by:
   determining that the first operand is less than the product of the second operand and the third operand by a threshold value; and
   identifying a set of most significant bits in the composite register.

5. The computer-implemented method of claim 1, further comprising selecting the first portion of the composite register by:
   determining that the difference between the first operand and the product of the second operand and the third operand is less than a threshold value; and
   identifying a set of bits in the composite register residing between a set of least significant bits in the composite register and a set of most significant bits in the composite register.

6. The computer-implemented method of claim 1, wherein storing the first sequence of bits in the first portion of the composite register comprises:
   performing an AND operation with the first sequence of bits and a control signal that is configured to identify the first portion of the composite register; and
   performing an OR operation with a portion of the first sequence of bits and a portion of a sequence of zeros.

7. The computer-implemented method of claim 6, wherein the arithmetic operation comprises a multiply-add operation.

8. The computer-implemented method of claim 1, further comprising:
   receiving a fourth operand;
   determining that the fourth operand is equal to zero;
   overwriting each portion of the composite register with a sequence of zeros to generate a second composite value that is equal to zero; and
   combining the second composite value with the product of a fifth operand and a sixth operand to generate another final value.

9. The computer-implemented method of claim 8, wherein the arithmetic operation comprises a multiply-only operation.

10. The computer-implemented method of claim 1, wherein shifting the first mantissa is further based on the magnitude of the first operand.

11. The computer-implemented method of claim 1, wherein shifting the first mantissa comprises transmitting the first mantissa to a shifter circuit, and a first number of bits in the shifter circuit is less than a second number of bits in the composite register.

12. A system for performing an arithmetic operation, including:
    a shift circuit configured to:
       receive a first mantissa associated with a first operand,
       shift the first mantissa based on a difference between the first mantissa and a first product of a second operand and a third operand to generate a first sequence of bits,
       store the first sequence of bits in a first portion of a composite register, and
       store zeroes in one or more remaining portions of the composite register to generate a composite value; and
    a combining circuit configured to:
       combine the composite value with the first product to generate a final value.

13. The system of claim 12, wherein the shift circuit generates the composite value to align the first mantissa with the product of the second operand and the third operand.

14. The system of claim 12, wherein the shift circuit is further configured to select the first portion of the composite register by:
   determining that the first operand exceeds the product of the second operand and the third operand by a threshold value; and
   identifying a set of least significant bits in the composite register.

15. The system of claim 12, wherein the shift circuit is further configured to select the first portion of the composite register by:
   determining that the first operand is less than the product of the second operand and the third operand by a threshold value; and
   identifying a set of most significant bits in the composite register.

16. The system of claim 12, wherein the shift circuit is further configured to select the first portion of the composite register by:
   determining that the difference between the first operand and the product of the second operand and the third operand is less than a threshold value; and
   identifying a set of bits in the composite register residing between a set of least significant bits in the composite register and a set of most significant bits in the composite register.

17. The system of claim 12, wherein the shift circuit is configured to store the first sequence of bits in the first portion of the composite register by:
   performing an AND operation with the first sequence of bits and a control signal that is configured to identify the first portion of the composite register; and
   performing an OR operation with a portion of the first sequence of bits and a portion of a sequence of zeros.

18. The system of claim 17, wherein the arithmetic operation comprises a multiply-add operation.

19. The system of claim 12,
   wherein the shift circuit is further configured to:
      receive a fourth operand,
      determine that the fourth operand is equal to zero, and
      overwrite each portion of the composite register with a sequence of zeros to generate a second composite value that is equal to zero; and
   wherein the combining circuit if further configured to:
      combine the second composite value with the product of a fifth operand and a sixth operand to generate another final value.

20. The system of claim 12, wherein the arithmetic operation comprises a multiply-only operation.

21. A computing device, including:
   a system for performing an arithmetic operation, including:
      a shift circuit configured to:
         receive a first mantissa associated with a first operand,
         shift the first mantissa based on a difference between the first mantissa and a first product of a second operand and a third operand to generate a first sequence of bits,
         store the first sequence of bits in a first portion of a composite register, and
         store zeroes in one or more remaining portions of the composite register to generate a composite value; and
      a combining circuit configured to:
         combine the composite value with the first product of to generate a final value.

22. The computing device of claim 21,
   wherein the shift circuit is further configured to:
      receive a fourth operand,
      determine that the fourth operand is equal to zero, and
      overwrite each portion of the composite register with a sequence of zeros to generate a second composite value that is equal to zero; and
   wherein the combining circuit is further configured to:
      combine the second composite value with the product of a fifth operand and a sixth operand to generate another final value.

* * * * *